United States Patent
Fritsch

[15] 3,649,147
[45] Mar. 14, 1972

[54] EXTRUDER NOZZLE FOR PRODUCING PLASTIC FOILS

[72] Inventor: Rudolf Paul Fritsch, Stuttgart-Weilimdorf, Germany

[73] Assignee: Werner & Pfleideser, Stuttgart-Feuerbach, Germany

[22] Filed: Oct. 18, 1968

[21] Appl. No.: 768,824

[30] Foreign Application Priority Data

Oct. 24, 1967 Germany................................W 45036

[52] U.S. Cl..............................425/170, 425/192, 425/207, 425/376, 425/461
[51] Int. Cl. .......................................................B29f 3/06
[58] Field of Search..................18/12 G; 418/191, 200, 205, 418/206

[56] References Cited

UNITED STATES PATENTS

| 2,515,201 | 7/1950 | Dulmage | 18/12 G |
| 2,807,047 | 9/1957 | Olson | 18/12 G X |
| 3,036,336 | 5/1962 | Hayden | 18/12 G X |
| 2,291,578 | 7/1942 | Johnson | 418/200 X |

FOREIGN PATENTS OR APPLICATIONS

| 324,648 | 1/1930 | Great Britain | 18/12 G |

*Primary Examiner*—J. Spencer Overholser
*Assistant Examiner*—B. D. Tobor
*Attorney*—Hane & Baxley

[57] ABSTRACT

A nozzle for producing foils from plastic material, preferably thermoplastic synthetic plastic material, has a flow passage lengthwise of the casing of the nozzle. The passage defines at one end a wide exit slit and at the other end a feed port of annular configuration. Meshing gears of a gear pump interposed intermediate the exit slit and the feed port drive the plastic material through the flow passage and toward the exit slit. The widths of the slit, the gears and the flow passage are such that the flow of plastic material between the gears and the exit slit is of substantially uniform width whereby a substantially uniform gauge and strength characteristics of the foil across its width are obtained.

5 Claims, 3 Drawing Figures

Patented March 14, 1972

INVENTOR

RUDOLF PAUL FRITSCH

BY Hane and Baxley

ATTORNEYS

Patented March 14, 1972

INVENTOR
RUDOLF PAUL FRETSCH
BY Hane and Baxley
ATTORNEYS

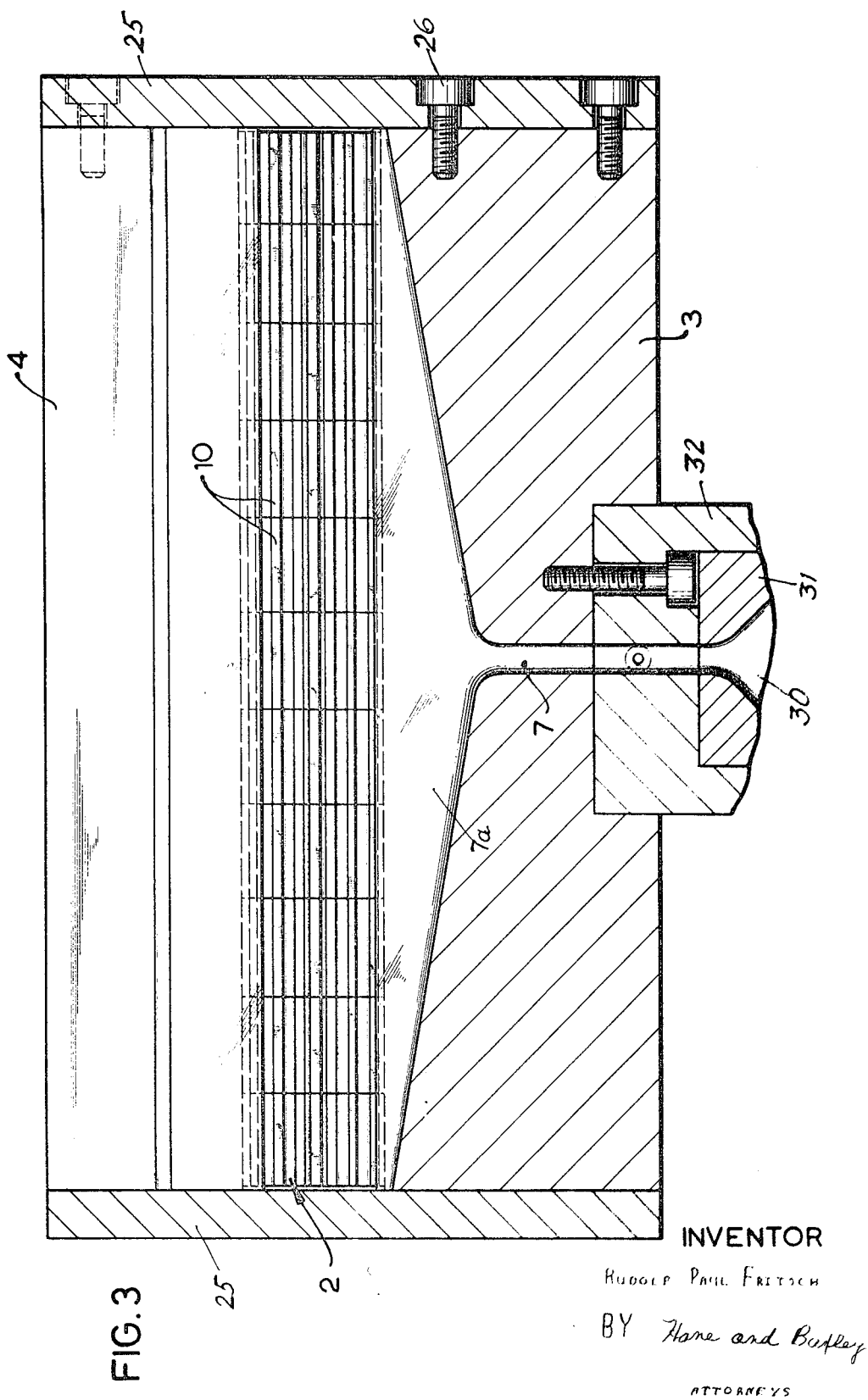

EXTRUDER NOZZLE FOR PRODUCING PLASTIC FOILS

BACKGROUND

The invention relates to a nozzle with a wide exit slit for producing foils, films or thin sheets (generally hereinafter referred to as foils for the sake of convenience) by extruding plastic material, preferably thermoplastic synthetic material.

In nozzles of this kind as heretofore known, hot melt is fed under pressure to a feed port or channel of annular configuration and it is desired to obtain a uniform distribution of the flow of the plastic material as it flows toward the exit slit.

For this purpose, it has been found to be necessary to retard the flow in about the mid part of the nozzle due to the different flow distances through which the plastic material must move. To obtain such control of the flow, it has been proposed to provide guide baffles intermediate the feed port and the exit slit and to adjust the positions of the baffles from the outside so as to define generally parabolic curves. Such an arrangement has the disadvantage that the extruded foils have different gauges and strength characteristics across their widths due to the artificially introduced higher flow resistance in the middle of the nozzle.

More recently, nozzles have been developed in which it has been attempted to force several equal flow paths upon the melt. However, attempts in this direction were also unsuccessful. Truly equal flow paths would require that the nozzle has the shape of a sector of a circle and such shape of the nozzle would entail correspondingly curved lips at the exit slit, which is not practical as it would be difficult to withdraw the foil from the nozzle — quite apart of the structural difficulties of producing nozzles of this kind.

It has also been attempted to overcome the aforeoutlined difficulties by inserting into the nozzle screws which convey from the inside toward the outside, and are externally driven. Such screws are intended to distribute the flow of the melt and also to have a self-cleaning action within the nozzle. However, nozzles of this kind were also not successful. They do not solve the basic problem which is to distribute the melt fed to the nozzle through a comparatively narrow flow path at a low pressure so that the width of the flow path between the pressure producing components of the nozzle and the lips at the exit slit of the nozzle is substantially uniform. Only if such conditions are maintained the flow conditions for the melt are uniform as is necessary to obtain uniform gauge and uniform strength characteristics across the width of the foil. Such uniform foils are required for many purposes of application, such as deep-draw vacuum molding.

It is an object of the invention to provide a novel and improved nozzle of the general kind above referred to in which the afore-outlined uniform flow conditions are obtained so that the produced foil is sufficiently uniform for all practical purposes.

Another object of the invention is to provide a novel and improved nozzle of the general kind above referred to, the output of which for any given material can be conveniently and accurately regulated.

SUMMARY

The afore-pointed out objects, features and advantages, and other objects, features and advantages which will be pointed out hereinafter, are obtained by interposing into a flow passage within the casing of the nozzle two gears which drive the flow of plastic material through the passage and toward a wide exit slit and by correlating the widths of the exit slit, the gears and the flow passage on the upstream side of the gears so that the plastic material is caused to flow along a path of uniform width. One of these gears is a one piece gear and externally driven at one end and the other gear comprises a shaft on which a plurality of gear sections are rotatable and a further gear section is keyed against rotation, the keyed gear section being preferably disposed opposite to the driven end of the one piece gear.

The plastic material from which the foil is to be formed is fed to the entry port of the nozzle at a pressure which can be regulated in accordance with the pressure in the flow of the plastic material upstream of the meshing gears. Control means permit a setting of the feed pressure so that the output of the nozzle remains constant for a given product without requiring varying the drive for the gears.

DRAWING

In the accompanying drawing, a preferred embodiment of the invention is shown by way of illustration and not by way of limitation.

In the drawing:

FIG. 3 is a section taken on line III—III of FIG. 1.

Figure 1:
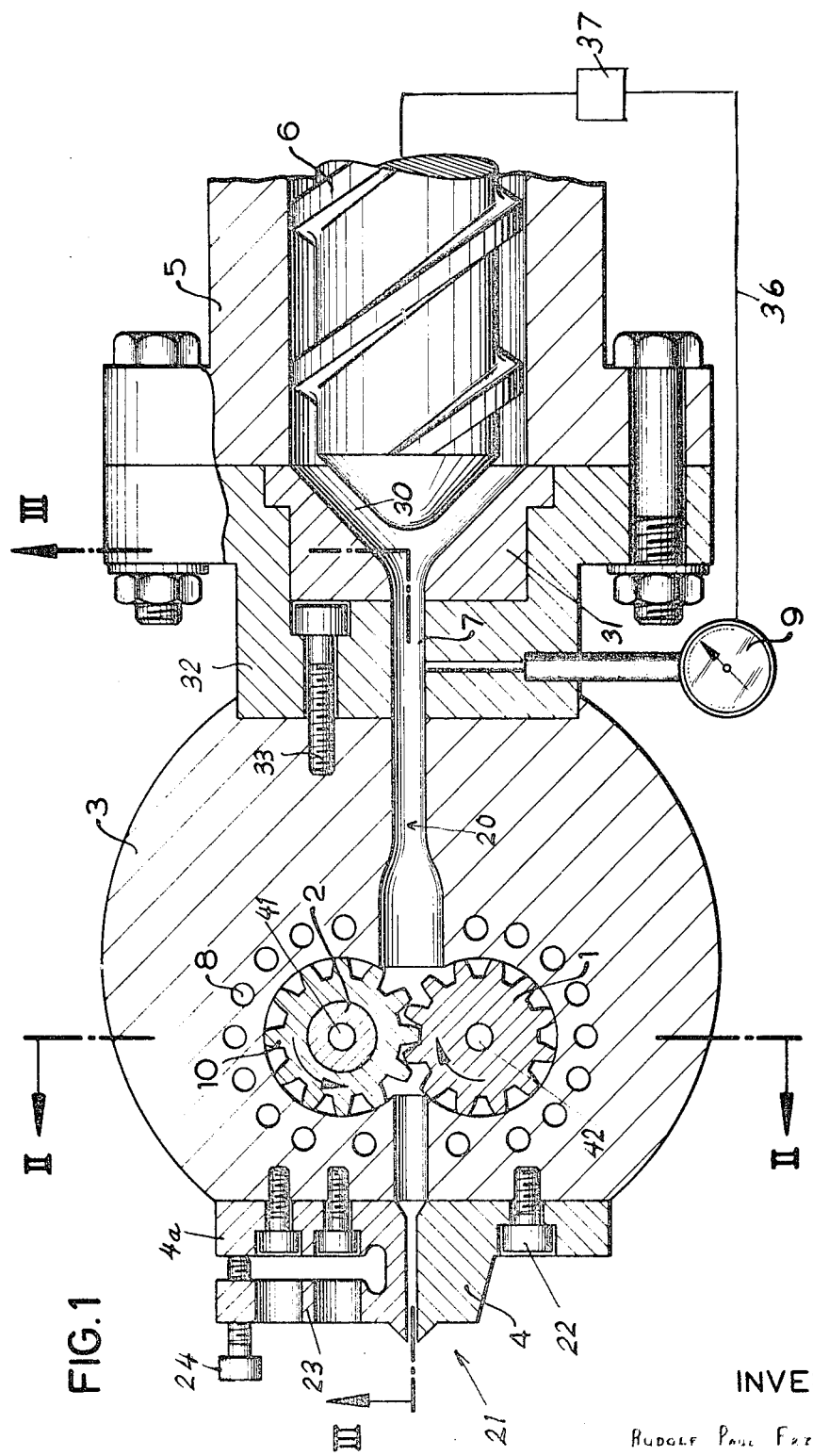
FIG. 1 is a cross-sectional view of a nozzle according to the invention.

Referring now to the figures more in detail, the exemplified nozzle comprises an elongate casing 3, preferably of generally cylindrical cross-section. A lengthwise elongate flow passage 20 is provided within the casing across the diameter thereof. The flow passage defines at one end an exit slit 21. This slit is formed by a lip 4 suitably secured for instance by screws 22, to a flattened portion of the casing. The crosswise width of the slit can be adjusted by forcing a lip portion 23 more or less closely to a part 4a of the lip body by means of a set screw 24. As is evident, tightening of the set screw will cause a corresponding deformation of the crosswise width, that is, the thickness of the slit. The lengthwise width of the slit preferably corresponds to the maximal width of the foils to be produced.

The slit is closed at both ends either by terminating it short of the face walls of the casing, or as shown by securing end plates 25 to the casing body, for instance by screws 26.

The other end of flow passage 20 terminates in a feed port 30 of annular cross-section. The port is inwardly tapered toward an intermediate portion 7 of the flow passage which, in turn, is continued by a widened portion 7a for a purpose which will be apparent from the subsequent description.

While port 30 may be formed directly in the body of the casing, it may also be formed as shown in a separate body 31 fitted in a carrier body 32, which, in turn, is secured to the casing by suitable fastening means such as screws 33. The hot plastic melt is fed to port 30 by means of a conventional conveyor screw 6 which should be visualized as being supplied with melt and is rotatably supported in a sleeve or drum 5.

There is further shown a pressure-sensitive control device 9 which probes the pressure of the plastic flow in portion 7 of the flow passage, and should be visualized as being conventional. The indications of the device may be used to regulate manually the pressure feed of plastic material so that the foil output of the nozzle remains constant for a given plastic material, or as is diagrammatically indicated by a linkage 36 and a block 37 such regulation may be automatically effected by control means suitable and conventional for the purpose.

Figure 2:
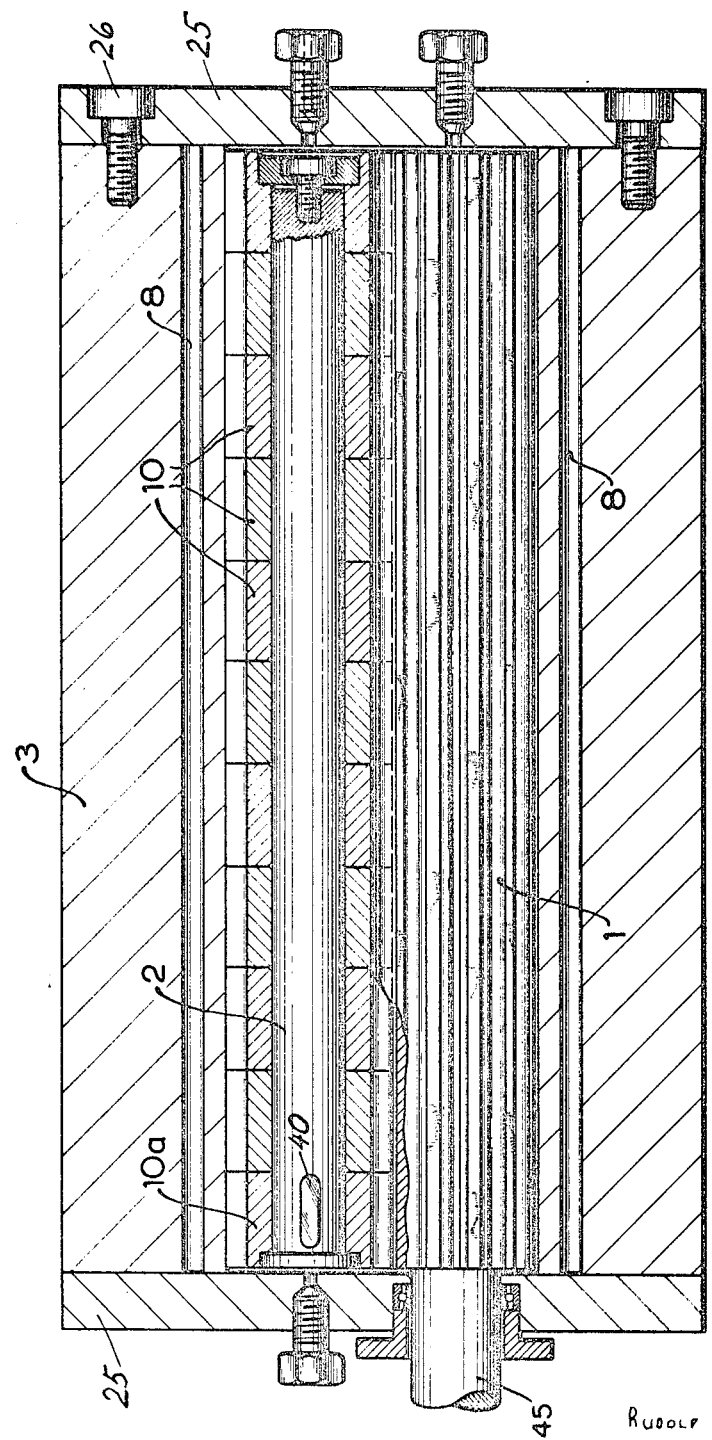
FIG. 2 is a section taken on line II—II of FIG. 1, a gear shaft being shown for only one of the gears.

The plastic material is driven through flow passage 20 by a gear pump type conveyor. This pump is shown as comprising an elongate gear 1 which is externally driven by suitable drive means, as it is indicated in FIG. 2 by a shaft 45 at one end of the gear, and a second gear which is formed by a plurality of gear sections 10 freely rotatable on a shaft 2. In addition to the freely rotatable gear sections, a gear section 10a is keyed to shaft 2, as it is indicated at 40 in FIG. 2. The keyed gear section is preferably located adjacent or next to the end of gear 1 to which the drive for the gear is connected.

As is evident, the gear sections 10 on shaft 2 and also the shaft itself via gear section 10a are rotated by gear 1 when the latter is driven. The gears mesh within the flow passage and more specifically, within the widened portion 7a thereof. The total width of the gear pump corresponds to the maximal width of flow passage portion 7a and also to the lengthwise width of exit slit 4. Accordingly, the flow of plastic material when it reaches the gears is subjected to the action thereof across the entire width of the flow and it continues at the same width until it is extruded at the exit slit, thus assuring the desired uniform properties of the extruded foil across its entire width.

A plurality of ducts 8 in the casing permit to circulate a heat exchanging fluid within the nozzle casing to control the temperature thereof. Similarly, axial bores 41 and 42 in the gears permit control of the temperature of the gears by passing a heat exchanging fluid through the shafts, or at least part thereof.

What is claimed is:

1. A nozzle for producing foils by extruding plastic material in pliable condition, said nozzle comprising in combination:
   an elongate nozzle body including a crosswise flow passage having a width corresponding to the desired width of the foil, said flow passage terminating at one end in an exit slit having a thickness and width corresponding to the desired thickness and width of the foil and at the other end in a feed port; and
   a gear pump within said nozzle body for conveying plastic material from the feed port through the flow passage toward the exit slit, said gear pump being interposed in the flow passage intermediate the feed port and the exit slit, the width of said passage upstream of the gear pump being gradually narrowed toward said port, said gear pump including:
   two parallel gear shafts extending crosswise of the flow passage, a first one of said shafts being arranged to be power driven,
   a single gear wheel having continuous teeth of a length corresponding to the crosswise width of the flow passage secured upon said first shaft for rotation in unison therewith,
   a plurality of identical gear wheels having an outer peripheral outline equal to that of said single gear wheel seated on the second shaft in mesh with the teeth of the gear wheel on the first shaft, the combined length of said plurality of gear wheels matching the length of the single gear wheel on the first shaft, one of the gear wheels in said plurality of gear wheels being secured to the second shaft for rotating the same upon rotation of the first shaft, the other gear wheels being freely rotatable on the second shaft for rotation by engagement with the gear wheel on the first shaft.

2. The nozzle according to claim 1 and further comprising conveyor means for pressure feeding the plastic material to said port, and pressure-sensitive flow control means detecting the pressure of the plastic flow in a portion of said flow passage upstream of said gear pump for controlling the feed pressure of said conveyor means so as to maintain a substantially constant feed of plastic material to said port.

3. The nozzle according to claim 1 wherein the gear shafts of said gear pump include axial ducts for passage of a heating fluid, and wherein said nozzle body also includes ducts for passage of a heating fluid.

4. The nozzle according to claim 1 wherein said first shaft is arranged to be driven from one end thereof, the gear wheel secured to the second shaft being located opposite to said one end of the first shaft.

5. The nozzle according to claim 1 wherein said port has an annular entry opening issuing into said narrow portion of the flow passage.

* * * * *